US008321527B2

(12) United States Patent
Martin et al.

(10) Patent No.: US 8,321,527 B2
(45) Date of Patent: Nov. 27, 2012

(54) SYSTEM AND METHOD FOR TRACKING USER LOCATION AND ASSOCIATED ACTIVITY AND RESPONSIVELY PROVIDING MOBILE DEVICE UPDATES

(75) Inventors: John Jeffrey Martin, Hillsborough, CA (US); Steve Hales, Palo Alto, CA (US); Joseph Vierra, Hayward, CA (US); Eugene Han, Santa Clara, CA (US); Alberto Moriondo, Barrington, IL (US)

(73) Assignee: Tribal Brands, San Mateo, CA (US)

( * ) Notice: Subject to any disclaimer, the term of this patent is extended or adjusted under 35 U.S.C. 154(b) by 0 days.

(21) Appl. No.: 12/557,243

(22) Filed: Sep. 10, 2009

(65) Prior Publication Data
US 2011/0060807 A1    Mar. 10, 2011

(51) Int. Cl.
G06F 15/16    (2006.01)
(52) U.S. Cl. .......................................... 709/217; 709/245
(58) Field of Classification Search .................. 709/217, 709/245; 705/14.49–14.67
See application file for complete search history.

(56) References Cited

U.S. PATENT DOCUMENTS

| 7,084,758 | B1 | 8/2006 | Cole | |
| 7,386,517 | B1* | 6/2008 | Donner | 705/75 |
| 7,415,424 | B1* | 8/2008 | Donner | 705/5 |
| 7,528,713 | B2 | 5/2009 | Singh | |
| 7,541,940 | B2 | 6/2009 | Upton | |
| 7,551,780 | B2* | 6/2009 | Nudd et al. | 382/190 |
| 7,577,522 | B2 | 8/2009 | Rosenberg | |
| 7,583,972 | B2 | 9/2009 | Clipsham | |
| 7,610,365 | B1* | 10/2009 | Kraft et al. | 709/223 |
| 7,630,986 | B1 | 12/2009 | Herz | |
| 7,668,931 | B2* | 2/2010 | Parupudi et al. | 709/217 |
| 7,941,133 | B2 | 5/2011 | Aaron et al. | |
| 2006/0069749 | A1* | 3/2006 | Herz et al. | 709/219 |
| 2006/0225076 | A1 | 10/2006 | Longobardi | |
| 2008/0281687 | A1* | 11/2008 | Hurwitz et al. | 705/14 |
| 2008/0288355 | A1* | 11/2008 | Rosen | 705/14 |
| 2009/0012861 | A1* | 1/2009 | Krishnaswamy et al. | 705/14 |
| 2009/0157496 | A1* | 6/2009 | Davis et al. | 705/14 |
| 2009/0254971 | A1 | 10/2009 | Herz | |
| 2010/0004997 | A1* | 1/2010 | Mehta et al. | 705/14.66 |
| 2010/0070334 | A1* | 3/2010 | Monteverde | 705/10 |

* cited by examiner

Primary Examiner — David Lazaro
Assistant Examiner — Edward Kim
(74) Attorney, Agent, or Firm — Blakely Sokoloff Taylor & Zafman LLP

(57) ABSTRACT

A system and method are described for monitoring user location and activity over a period of time and intelligently scheduling content distributions to the user's mobile device. For example, one embodiment of a system for intelligently scheduling a content distribution to a mobile device comprises: a location database to store a plurality of different locations including event facilities and points of interest, the location database associating each of the different locations with a Global Positioning System (GPS) location or range of GPS locations; a data collection module for collecting user location data over a period of time, user location data specifying a user's mobile device's location throughout the period of time, the data collection module to store the user location data within a database; a predictive scheduler module to analyze the user location data over the period of time and responsively schedule content distributions to the user's mobile device based on the analysis of the user location data.

18 Claims, 8 Drawing Sheets

User Database(s) 215

| Time | Location | User Activities | Wireless Signal |
|---|---|---|---|
| 7:00 AM | Home | Checking Email; Listening to Beat It. | Good |
| 8:00 AM | Caltrain Station SFO | Checking Email; Checking CNN.com | Good |
| 9:00 AM | Work | Listening to Viva La Vida | Fair |
| 10:00 AM | Work | No activity | Fair |
| 11:00 AM | Work | Checking Calendar | Fair |
| 12:00 AM | Starbucks Palo Alto | Sending SMS Messages | Poor |
| ----- | ----- | ----- | ----- |

User Location and Activity Data 220

*Fig. 3*

Database(s) 215

| Date | Time | Location | Event | Targeted Content |
|---|---|---|---|---|
| Oct 1, 2009 | 9:30 PM | HP Pavilion, San Jose, CA | San Jose Sharks vs. Colorado Avalanche | 88629980934 |
| Jul 16, 2009 | 7:30 PM | HP Pavilion, San Jose, CA | Fight Night at the Tank | 88627990234 |
| Jul 21, 2009 | 7:30 PM | HP Pavilion, San Jose, CA | Earth, Wind & Fire | 88612330234 |
| Jul 21, 2009 | 3:00 PM | HP Pavilion, San Jose, CA | The Wiggles | 88628879872 |
| Jul 21, 2009 | 6:30 PM | HP Pavilion, San Jose, CA | The Wiggles | 88628879872 |
| Jul 21, 2009 | 7:30 PM | HP Pavilion, San Jose, CA | An Evening With Il Divo | 88655465452 |
| Jul 21, 2009 | 7:00 PM | HP Pavilion, San Jose, CA | Jonas Brothers | 88600820938 |
| Jul 27, 2009 | 7:15 PM | AT&T Park, San Francisco, CA | San Francisco Giants vs. Pittsburgh Pirates | 99200829838 |
| Jul 28, 2009 | 7:15 PM | AT&T Park, San Francisco, CA | San Francisco Giants vs. Pittsburgh Pirates | 99200800920 |
| ----- | ----- | ----- | ----- | ----- |

Events Database 420

Database(s) 215

| Location | Event | Date | Time | Reminder |
|---|---|---|---|---|
| HP Pavilion, San Jose, CA | San Jose Sharks vs. Colorado Avalanche | Oct 1, 2009 | 9:30 PM | Pick up T shirt for Garrett |
| Whole Foods | N/A | N/A | N/A | Milk<br>Cheese<br>Eggs<br>Ahi Tuna<br>*** |
| St Andrews Elementary School | N/A | N/A | N/A | Pick up Madeline's science project |
| ----- | ----- | ----- | ----- | ----- |

Location-Based Reminder Data 621a, b

US 8,321,527 B2

SYSTEM AND METHOD FOR TRACKING USER LOCATION AND ASSOCIATED ACTIVITY AND RESPONSIVELY PROVIDING MOBILE DEVICE UPDATES

BACKGROUND

1. Field of the Invention

The invention relates generally to the field of network data processing systems. More particularly, one embodiment of the invention relates to an architecture and method for analyzing user location and associated activity and responsively providing mobile device updates. Additionally, one embodiment of the invention relates to an architecture and method for determining an event which a user is attending based on location, date and time data. Finally, one embodiment of the invention relates to a location-based reminder system.

2. Description of Related Art

Current location-based technologies such as GPS (Global Positioning System) allow the location of a mobile device to be precisely tracked and used in a variety of applications. By way of example, location data generated by GPS-enabled mobile devices may be used by mapping programs which identify the current location of the mobile device on a map. In addition, some mobile devices may be configured to share the current location of a user with the user's "friends," either by publishing the user's current location to a Website or by dynamically transmitting the user's current location to other mobile devices. For example, the Loopt® application for the iPhone® allows a user to identify a set of "friends" to receive continuous updates of the user's current location within a map-based graphical user interface.

However, current location-based systems do not compile location data for a user over time to determine the user's behavior patterns while at different locations. Additionally, current location-based system do not combine location data with the current date and time to determine the context in which the user is at a particular location. Such information would be useful, for example, to provide targeted content to the end user while at different locations on specific dates and times and/or to provide targeted content based on the anticipated daily or weekly schedule of the end user.

SUMMARY

A system and method are described for monitoring user location and activity over a period of time and intelligently scheduling content distributions to the user's mobile device. For example, one embodiment of a system for intelligently scheduling a content distribution to a mobile device comprises: a location database to store a plurality of different locations including event facilities and points of interest, the location database associating each of the different locations with a Global Positioning System (GPS) location or range of GPS locations; a data collection module for collecting user location data over a period of time, user location data specifying a user's mobile device's location throughout the period of time, the data collection module to store the user location data within a database; a predictive scheduler module to analyze the user location data over the period of time and responsively schedule content distributions to the user's mobile device based on the analysis of the user location data.

BRIEF DESCRIPTION OF THE DRAWINGS

A better understanding of the present invention can be obtained from the following detailed description in conjunction with the following drawings, in which:

FIG. 3 illustrates an example of location and activity data associated with an end user.

FIG. 5 illustrates event data managed in one embodiment of the invention.

FIG. 7 illustrates location-based reminder data employed in one embodiment of the invention.

DETAILED DESCRIPTION OF PREFERRED EMBODIMENTS

Described below is a system and method for tracking and analyzing the location of a user and associated activity and responsively updating the user's mobile device with targeted content. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

One embodiment of the invention compiles location data for a user over time to determine the user's daily/weekly schedule and behavior patterns (described generally below as "user activity data"). Once a user's schedule and behavior patterns have been identified, one embodiment of the invention uses this information to schedule targeted content distributions to the user's mobile device. For example, one embodiment of the system analyzes user data to predict where the user will be at a particular date/time and schedules targeted content based on the prediction. Additionally, one embodiment of the invention combines location data with event data (including date and time information) to determine the context in which the user is at a particular location. Based on the context, targeted content associated with that context is transmitted to the end user's mobile device. In addition, in one embodiment of the invention allows end users to trigger personal reminders upon arriving at particular locations (rather than limiting personal reminders to particular user-specified dates/times). The personal reminders may be programmed from within a calendar application or other type of application.

Figure 1:
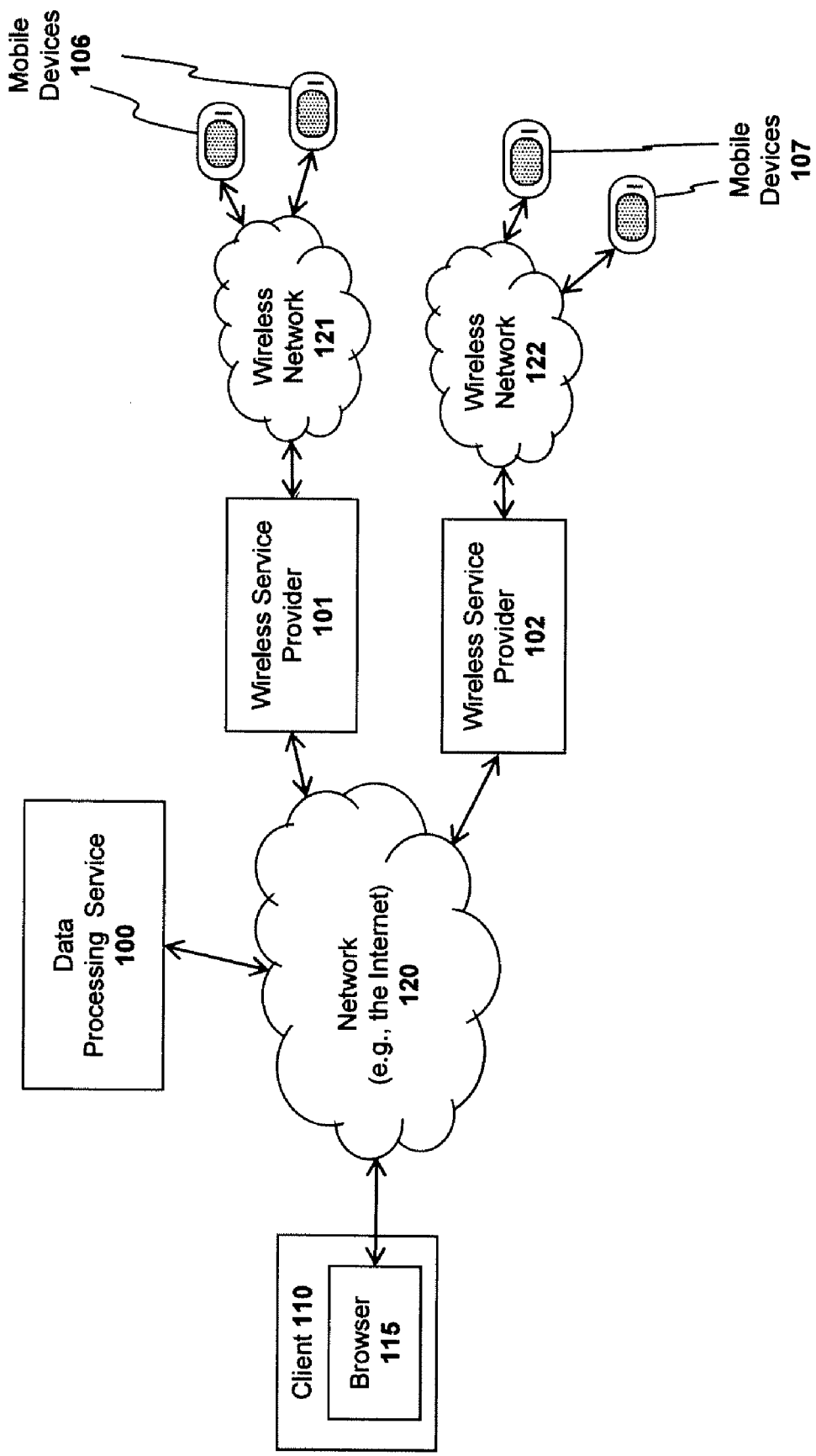
FIG. 1 illustrates a network architecture employed in one embodiment of the invention.

Pre-Caching of Targeted Content to a Mobile Device Based on Predicted User Activity and/or Location Referring now to FIG. 1, one embodiment of the invention is implemented within a data processing service 100 communicating over a data network 120 such as the Internet to one or more wireless service providers 101 and 102. The wireless service providers 101 and 102 provide wireless service to a plurality of wireless devices 106 and 107, respectively. The wireless networks 121 and 122 of the wireless service providers 101 and 102 support both voice and data traffic. In one embodiment, the data traffic is implemented using one of a variety of 3G wireless network protocols including, by way of example, GSM EDGE, UMTS, CDMA2000, DECT and/or WiMAX. It should be noted, however, that the underlying principles of the invention are not limited to any particular wireless communication standard.

Mobile devices 106 and 107 communicate with the data processing service 100 through the wireless networks 121 and 122 and data network 120. In one embodiment, users may also connect to the data processing service 100 via a standard personal computer 110 (e.g., a Windows-based computer or Macintosh) equipped with an Internet browser 115 or other application program. The browser connection may be used, for example, to manage user account data (e.g., system configuration preferences) and/or personal data (e.g., contact data, calendar data, buddy lists, etc) on the data processing service 100.

Figure 2:
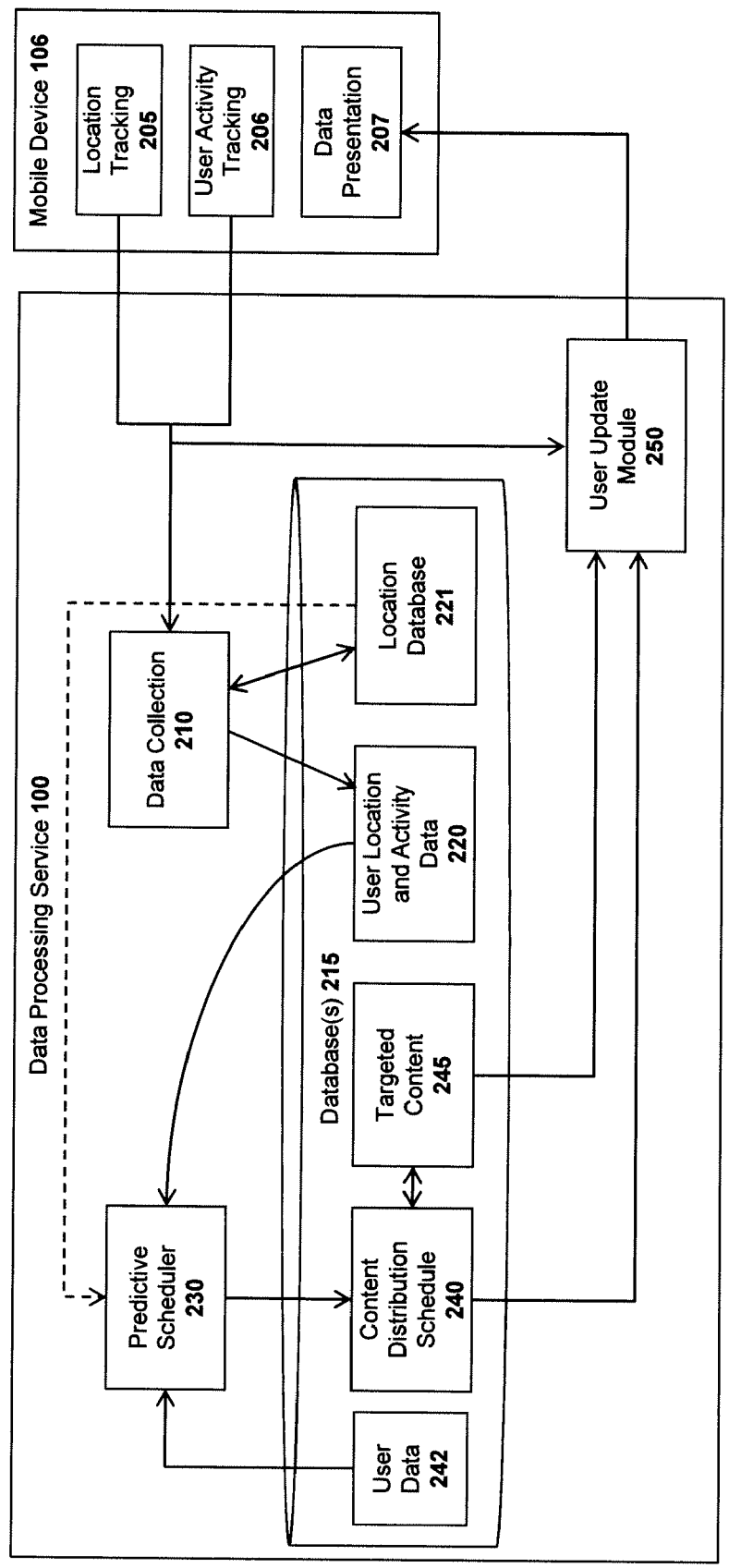
FIG. 2 illustrates one embodiment of a system architecture for monitoring user activity at various locations over time and responsively transmitting anticipating subsequent user behavior and transmitting targeted content to the user.

In one embodiment of the invention, the wireless devices 106 and 107 are equipped with location tracking capabilities such as GPS. As illustrated in FIG. 2, in this embodiment, the location tracking capabilities are implemented by location tracking circuitry and software 205 on the mobile device 106, which collects and reports the mobile device's current location to the data processing service 100 (i.e., over the various wireless and wired networks, not shown in FIG. 2 for simplicity). In addition, in one embodiment, a user activity tracking module 206 collects and reports user activity on the mobile device 106. User activity may include, for example, specific applications executed on the mobile device (e.g., games, word processing applications, etc), the operations performed by those applications (e.g., results of a particular game), particular Web sites visited by the user, and messages transmitted to and from the wireless device. A data collection module 210 on the data processing service 100 actively collects the location tracking data and user activity data and stores this information within a database 215 (shown in FIG. 2 as user location and activity data 220).

The data collection module 210 may determine the mobile device's current location and associated activity continuously, periodically (e.g., once every 15 minutes), or as the user's location changes. Moreover, the current location may be collected via either a "pull" technique, in which the data collection module 210 explicitly requests the current location (and the location tracking module 205 on the mobile device 106 responsively provides the current location); or the location tracking module 205 may actively "push" its current location to the data collection module 210 (without a request from the data collection module 210).

In one embodiment, the database 215 is used for all persistent storage on the data processing service 100. Various different technologies may be used to implement the database 215 including, for example, MySQL and Microsoft SQL. Of course, the underlying principles of the invention are not limited to any particular database technology.

A location database 221 is maintained on the data processing service 100 which stores known location names and associated attributes for those locations. A virtually unlimited number of relevant locations may be stored within the location database 221 including, for example, event facilities, restaurants, bus/train stops, and various points of interest (e.g., museums, parks, coffee shops, bowling alleys, etc). In one embodiment, the location database 221 includes the same types of location data as currently found, for example, in Google® Maps and Yahoo® Maps. In addition, in one embodiment, the location database 221 is continually updated with the current conditions associated with each location including, for example, wireless service coverage and/or traffic information. For example, if an event facility is known to have degraded wireless coverage, this information is stored in the location database 221 and subsequently utilized by the embodiments of the invention described herein. Similarly, if a traffic accident has occurred or if a train is running late, this information may also be updated within the location database 221.

In one embodiment, the user may enter one or more personal locations within the location database 221 and/or within a separate user database 242. For example, the user may specify the location of the user's home and place of business. This information is then used to identify when the user is at one of the personal locations, as described below.

In one embodiment, the location tracking module 205 on the mobile device 106 provides location data to the data processing service 100 in a standard latitude/longitude format. The data collection module 210 queries the location database 210 using the location data to identify the point of interest, event facility, etc, associated with that location. Alternatively, the location tracking module 205 on the mobile device 205 utilizes a local location database (not shown) to determine the point of interest, etc, and reports this information directly to the data collection module 210. In such a case, the location database 221 on the data processing service need not be utilized.

Regardless of how a particular location and its characteristics are determined, in one embodiment the data collection module 210 stores this information as user location and activity data 220 within the database 215. As shown in FIG. 3, in one embodiment, the user location and activity data comprises a time, location, activity, and wireless signal strength. For the purpose of illustration, the user location and activity data 220 is collected every hour. The user location and activity data 220 may be collected in various other ways while still complying with the underlying principles of the invention. For example, in one embodiment, the user location and activity data 220 may be collected each time the user changes location (in addition to or in lieu of collecting the data periodically).

As illustrated in FIG. 3, the location is stored in the form of a location name (e.g., event facility, point of interest, etc), rather than merely a raw location value (e.g., longitude/latitude). The user activity stored in the database includes a listing of all relevant operations performed on the data processing device since the last time user activity was checked. The wireless signal strength associated with each location is continually updated and archived within the user location and activity data 220. The end result is a precise picture of the user's daily location, associated activities and wireless signal strength. As described below, the embodiments of the invention utilize this information to provide targeted content to the end user at certain specified times, locations, and/or while performing certain activities on the mobile device 106. In one embodiment, the user activities are analyzed to determine appropriate promotions and other content to deliver to the end user. For example, if the user frequently plays video games on the way to work, this information may be used to generate promotions or other content related to games and/or the characters in the video games during this period of time. Similarly, if the user often listens to a particular band, this information may be used to identify and transmit content related to the band (e.g., promotions, new tracks, etc).

More specifically, as illustrated in FIG. 2, a predictive scheduler module 230 analyzes the user activity data 220 to determine periodic trends and to anticipate subsequent user behavior. For example, the predictive scheduler module 230 may determine that the user's schedule remains relatively consistent at certain times during the work week (e.g., Monday through Friday they user may commute to work at the same time each day). It then identifies certain times each day at which the user is likely to be at certain locations. For example, if the user follows the same basic commute schedule each workday, as determined by evaluating the data shown in FIG. 3, then it may be assumed that at 8:00 AM each day, the user will be waiting at the Caltrain station in San Francisco. In one embodiment, the user's activity is also analyzed by the predictive scheduler module 230 to predict subsequent activities by the user. By way of example, the user may often be performing the same activity at a certain point during the day (e.g., checking email while waiting at the Caltrain station).

In one embodiment, the predictive scheduler module 230 uses the predicted user location, activity and wireless signal strength to generate a content distribution schedule 240 for transmitting targeted content 245 to the end user. For example, if the location database 221 indicates that the Caltrain station in San Francisco has a coffee shop, then a user update module 250 on the data processing service 100 may transmit an electronic "coupon" for a free cup of coffee prior to 8:00 AM. In one embodiment, the electronic coupon includes a bar code displayed on the mobile device's display which may be read by an optical scanner at the point of sale. When the coupon is used, this information is transmitted from the point of sale back to the data processing service 100 and stored as user preference data 242 for subsequent targeted content distributions. If the Caltrain station in San Francisco is known to have a poor wireless signal, then the predictive scheduler module 230 may pre-cache the targeted content 245 to the mobile device 106 prior to the user's arrival at the Caltrain station (e.g., a specified amount of time prior to 8:00 AM and/or when the mobile device 106 is detected within a specified range of the Caltrain station).

By way of another example, if the user commutes to/from work in a car each day over a particular route, then the predictive scheduler module 230 may generate a content distribution schedule 240 to pre-cache the mobile device 106 with content related to businesses along the user's commute route (e.g., Starbucks certificates, promotions to restaurants, etc).

In one embodiment, the predictive scheduler 230 also evaluates user data 242 when generating the content distribution schedule 240. The user data 242 includes user preferences collected via a questionnaire answered by the end user and/or by monitoring the user's activity (e.g., purchase habits, Websites visited, songs stored on mobile device, etc). The user data 242 may also include events which the user is scheduled to attend. Returning to the example above, if the user data 242 indicates that the user is not a coffee drinker but is a tea drinker, then the coupon may specify a free cup of tea. Similarly, if the user data 242 indicates that the user is scheduled at an out-of-town event on a particular day, then the predictive scheduler 230 will refrain from transmitting the coupon on that day. If the user data 242 indicates that the user has young children, then the predictive scheduler 230 may transmit promotions and other content related to young children (e.g., coupons for a toy store located along the user's commute route).

The user data 242 may include ticket purchases made on the mobile device 106 including tickets to a concerts, movies, sporting events, etc. In such a case, this event information is utilized by the predictive scheduler 240 to generate the content distribution schedule 240. For example, just prior to a concert, targeted content 245 related to the performer may be pre-cached to the mobile device. The targeted content 245 in this example may include a free music video or music track, membership in a fan club, discounts on concessions at the event venue, a map of the event venue, directions to the event venue, etc.

The decision to pre-cache data to the mobile device 106 may be based on the known wireless signal strength at the event venue. For example, if the signal strength for the user's wireless service provider is poor at the event venue then the predictive scheduler module 230 may choose to pre-cache all data related to the event prior to the user's arrival at the event venue. If the user purchased a ticket to the event electronically using the mobile device 106, then the event ticket is downloaded to the mobile device 106 prior to arrival at the event venue (e.g., either a specified amount of time prior to the event or when the user is a specified distance from the event venue). In one embodiment, the ticket is displayed on the user's mobile device 106 in the form of a bar code which is scanned by an optical scanner at the event venue to authorize access.

The architecture shown in FIG. 2 may also be used to pre-cache data to the mobile device 106 based on the user's daily work schedule and/or predicted wireless signal strength. For example, if it is known that certain points along the Caltrain route have degraded wireless service (as indicated by the user location and activity data 220), then the data processing service 100 may pre-cache data on the mobile device 106 that the user typically accesses during this period of time. For example, if the user typically checks news headlines on CNN.com and checks email during this period, then the data processing service 100 may pre-cache CNN.com headline stories to the mobile device. Similarly, if the user typically checks email during this period, then the mobile device 106 may automatically access and download the user's email prior to arrival at the train station.

Similarly, if a set of related content is scheduled for delivery to wireless devices of users attending a concert and the wireless signal strength is determined to be poor at the location of the concert venue, then the predictive scheduler 230 will schedule delivery of the set of related content prior to arrival at the venue. For example, the predictive scheduler may pre-cache the mobile device of a user 106 with content related to the concert when the user is within a specified distance from the concert venue and/or a specified amount of time prior to the concert. In one embodiment, the content is pre-cached to the mobile device but is not triggered until the user arrives at the venue. Various different triggering events may be employed. For example, in one embodiment, the related content is triggered upon the user entering the concert venue with an electronic ticket purchased from the mobile device 106 (e.g., by displaying a bar coded ticket on the mobile device's display). Alternatively, the related content may be triggered at a certain specified time.

A virtually unlimited number of different types of targeted content 245 including promotional information, advertisements, etc, may be scheduled for delivery to the mobile device 106 based on the user's anticipated location, anticipated activity at that location, and anticipated signal strength at that location.

Figure 4:
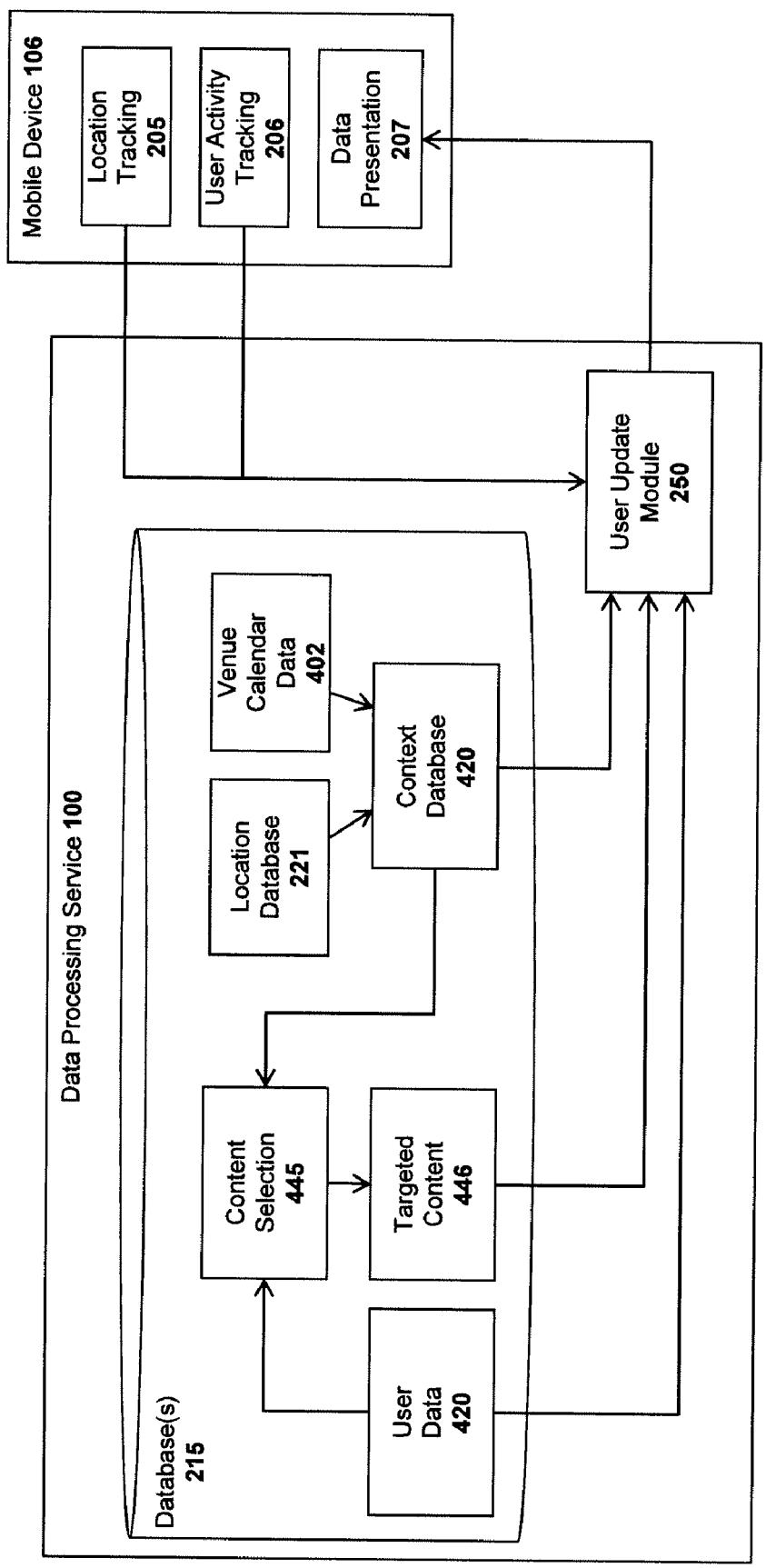
FIG. 4 illustrates one embodiment of a system architecture for determining an event that a user is attending and transmitting targeted content to the user.

Transmitting Targeted Content to a Mobile Device Based on Location Context and User Data In addition to pre-caching content to wireless data processing devices, one embodiment of the invention determines the context in which a user is at a particular location and provides targeted content based on that context. As used herein, the "context" involves an evaluation of the current date and time as well as the location of the end user to determine the event which is occurring at that location. As illustrated in FIG. 4, as in prior embodiments, the data processing service 100 maintains a location database 221 for associating GPS locations with various known event venues such as sports arenas, theaters, parks, museums and other multi-purpose venues. In addition, in the embodiment illustrated in FIG. 4, venue calendar data 402 is combined with the location data to generate a context database 420, comprised of locations, dates, times, and associated events.

As illustrated in FIG. 5, each entry in the context database 420 includes a date, a time, a location, an event name and an identifier uniquely identifying targeted content for the event. In one embodiment, a content selection module 445 selects a set of targeted content 446 to distribute to the end user at a particular event (or prior to the event, as described above) based on the information in the context database 420 and user data 420 containing user preferences and other personal data (e.g., a user's calendar). As mentioned above, the user preferences may be determined via a questionnaire answered by the end user and/or by monitoring the user's activity (e.g., purchase habits, Websites visited, songs stored on mobile device, etc). The personal data may include events which the user is scheduled to attend such as concert events, sporting events, movies, etc.

By way of example, if the user is at the HP pavilion in San Jose, then the content selection module 445 first determines the context in which the user as at the HP pavilion. If it is for a San Jose Sharks® game, then the targeted content 446 may include a free hot dog or discounted concessions. By contrast, if it is a Wiggles® concert, then the targeted content 446 may include a free membership to the Wiggles website, a free Wiggles T-shirt, and/or an advertisement for a new Disney® movie. In either case, the targeted content 446 may include a map to the venue, including the locations of various vendors and promotion sites for the different events.

In one embodiment, the user's preferences from the user data 420 will also be evaluated by the content selection module 445 when selecting targeted content. For example, if the user preferences indicate that the user is a fan of Pearl Jam, and the user is currently at a concert at the HP pavilion, then the targeted content may include a promotion related to an upcoming Pearl Jam concert in the Bay Area or a free downloadable Pearl Jam track. Various other types of targeted content 446 may be identified and transmitted to the mobile device 106 including, for example, local train and bus schedules at the time of the event, promotions for nearby locations (e.g., restaurants, sports facilities), and free merchandise (e.g., a free audio track or t-shirt).

It should be noted that the above examples are used merely for the purpose of illustration. The underlying principles of the invention are not limited to any specific event types or promotion types.

System and Method for Location-Based Reminders

Figure 6:
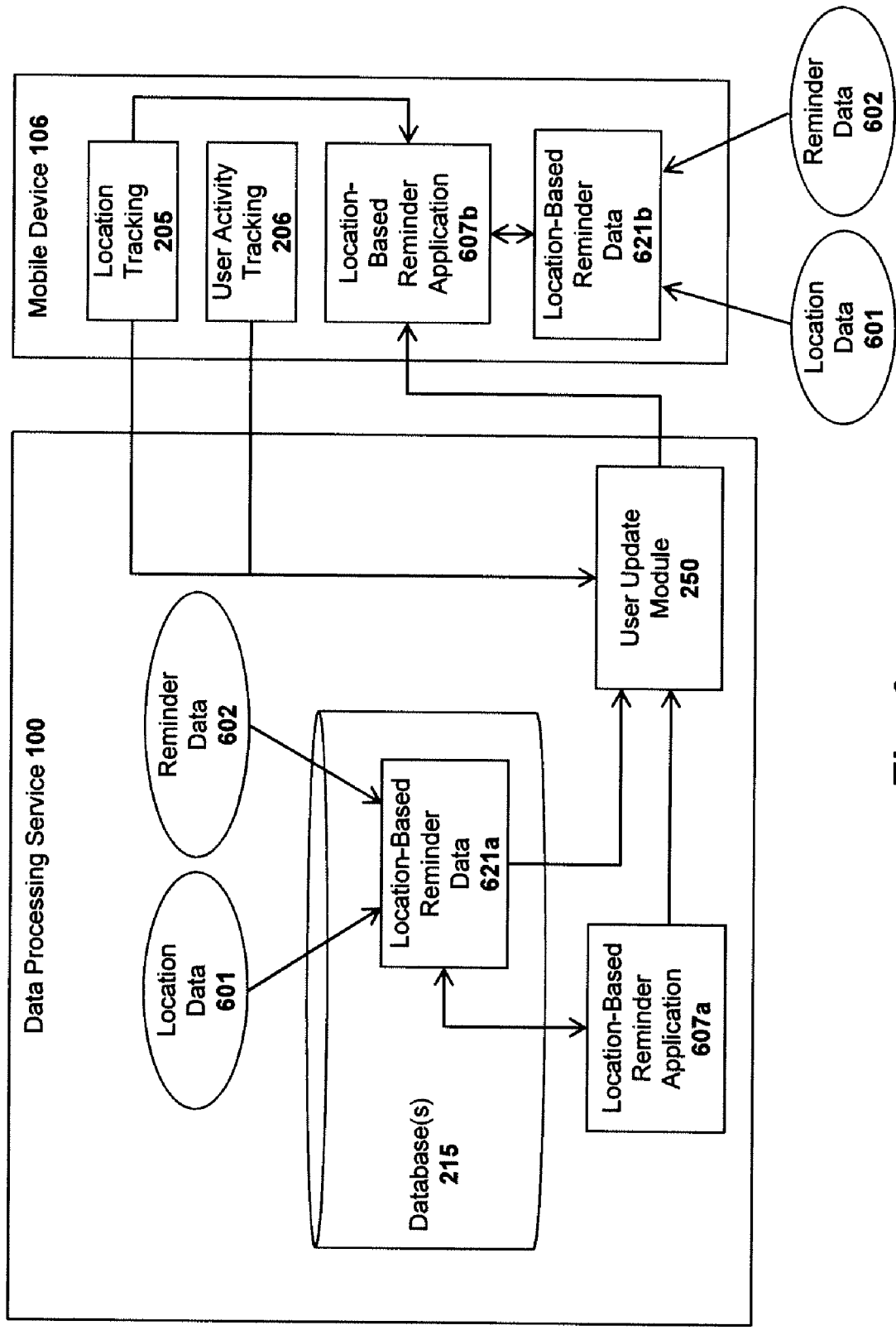
FIG. 6 illustrates a system architecture for generating location-based reminders according to one embodiment of the invention.

One embodiment of the invention generates location-based reminders set by the end user. As illustrated in FIG. 6, this embodiment may be implemented with a location-based reminder application 607a on the data processing service 100 and/or a location-based reminder application 607b on the mobile device 106. The location-based reminder application 607 may be a standard calendar application equipped with the location-based reminder capabilities described herein or, alternatively, may be a stand-alone application. In either case, the user sets a location-based reminder by specifying a particular location and a message to be displayed upon arrival at that location. The location may be specified, for example, by entering an address, a location name (e.g., a known point of interest, event venue, etc), or a more general location (e.g., "San Francisco").

The location-based reminders entered by the user are stored as location-based reminder data 621a and 621b on the data processing service 100 and/or on the mobile device 106, respectively. When the location tracking module 605 detects that the user has arrived within a location specified by the location-based reminder data, the location-based reminder application 607 triggers the reminder, thereby displaying the reminder on the mobile device 106. For example, a user may specify that the next time the user is at a supermarket, a reminder to purchase certain items should be generated. Similarly, if the user is planning on attending a concert event, the user may set a reminder to purchase a T-shirt for a family member while at the event.

In one embodiment, the reminder data is entered by the user as text within a text entry field displayed by the location-based reminder application (see, e.g., FIG. 8 and associated description below). In another embodiment, the reminder is transmitted to the end user as an SMS message. In this embodiment, the user update module 250 reads the location-based reminder data 621a stored on the data processing service 100, encapsulates the data in an SMS message, and transmits the SMS message to the end user upon arrival at the specified location. The SMS message is then displayed by an SMS application on the mobile device 106.

FIG. 7 illustrates an example of location-based reminder data 621a, 621b. As illustrated, each data entry comprises a location and a reminder associated with the location. The locations entered by the user in the example shown in FIG. 7 include "HP Pavilion," "Whole Foods" and "St. Andrews Elementary School." Different text-based reminders are entered for each location. For example, a grocery list is entered for Whole Foods, a reminder to purchase a T-Shirt is provided for HP pavilion, and a reminder to pickup a school project is provide for St. Andrews Elementary. In addition, for certain locations, the user may specify a date, time, and event name (e.g., using events stored within the context database 420 described above). For example, in FIG. 7, the user has selected a specific event at the HP pavilion at which to receive the reminder. The reminder will then only be triggered if the user is at the specified location at the specific date/time of the event. By contrast, the reminders associated with Whole Foods and St. Andrews Elementary will be triggered any time the user arrives at these locations.

Figure 8:
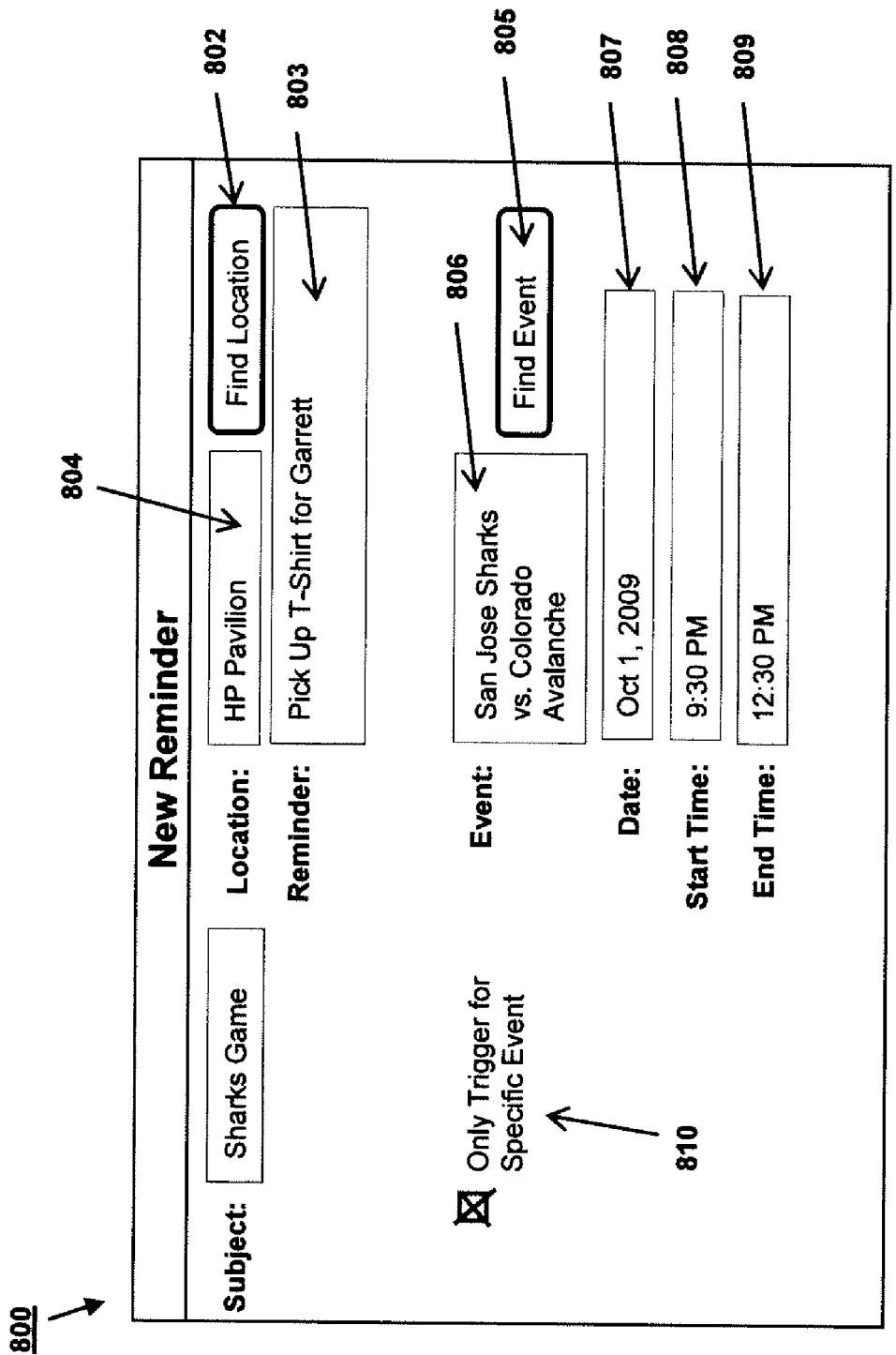
FIG. 8 illustrates a graphical user interface (GUI) for setting a location-based reminder.

FIG. 8 illustrates one embodiment of a graphical user interface (GUI) 800 for entering location-based reminders, either from the mobile device 106 or a client computer 110. As mentioned above, the reminder GUI may be a stand-alone reminder application and/or may be integrated within an existing calendar application. In the latter case, when the user sets a new calendar entry, the new calendar entry window provides options such as those shown in FIG. 8 for setting a location-based reminder (either in lieu of or in addition to a standard date/time entry).

As shown in FIG. 8, the new reminder entry includes a field 804 for manually specifying a particular location. In one embodiment, a "find location" button 802 is selected to allow the user to search for and verify a known address, city, point of interest, restaurant, etc, or any other type of location. In one embodiment, the search and verification is accomplished by performing a query to the location database 221 described above using data entered by the user. Upon selecting a location, a description of the location automatically appears within the location field 804.

In addition, a checkbox 810 is provided which, when selected, allows the user to specify that the location-based reminder should only be triggered upon arrival at the location for a particular event. Specifically, an event field 806 is provided for entering an event manually. In addition, in one embodiment, a "find event" button 805 is selected to allow the user to search for and verify a known event. Upon selecting an event, a description of the event appears within the event field 806, the date of the event appears within data entry field 807 and the start and end times for the event appear within data entry fields 808 and 809, respectively. In one embodiment, the event data within the context database 420 described above is searched upon selection of the find event button 805. In one embodiment, rather than entering a particular event, the user may simply select a date and time within data entry fields 807-809.

Throughout the discussion above, various details have been omitted to avoid obscuring the pertinent aspects of the invention. For example, both the data processing service 100 and the mobile devices 106, 107 include network interface hardware and software for communicating over the data network 120 and the wireless networks 121, 122, respectively. The network interface hardware/software is implemented with known networking components for packetizing data and transmitting the data over a network according to a particular network protocol. For example, if the data network 120 described herein is the Internet, then the various networking components packetize data into TCP/IP packets prior to transmission over the network. Similarly, the various functional modules and databases described herein may be executed across a plurality of servers which communicate over a local area network (LAN) using Ethernet at the data link and physical layers and TCP/IP at the transport/network layers of the OSI model. Moreover, the databases may be implemented using a Storage Area Network (SAN) or similar high-speed networking implementations.

Moreover, in an embodiment of the invention in which the user connects to the data processing service 100 via a Web browser, various well known functional modules are implemented to receive input, process the input and dynamically generate Web pages containing the results. The Web pages may be formatted according to the well known HyperText Markup Language ("HTML") or Extensible HTML ("XHTML") formats, and may provide navigation to other Web pages via hypertext links. Web pages are requested, dynamically generated, and transmitted from Web servers on the data processing service 100 using the Hypertext Transfer Protocol (HTTP). One embodiment of the invention employs application software written in PHP (a well known scripting language designed for producing dynamic web pages) running on Apache™ Web servers served off Linux platforms. In addition, in one embodiment, the databases described herein are Microsoft SQL databases or MySQL databases. It should be noted, however, that the underlying principles of the invention are not limited to any particular type of communications protocol or network architecture.

Although some of the embodiments of the invention are described separately and with different figures, all of these embodiments may be combined and implemented within a single comprehensive system. For example, the various system components illustrated in FIGS. 2, 4 and 6 may be combined and executed within a single data processing service 100.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, it will be readily apparent to those of skill in the art that the functional modules such as wizards and other logic may be implemented as software, hardware or any combination thereof. Accordingly, the scope and spirit of the invention should be judged in terms of the claims which follow.

What is claimed is:

1. A system for intelligently scheduling a content distribution to a mobile device comprising a one or more computers for storing program code and having one or more processors for processing the program code to perform the operations of:
   storing a plurality of different locations including event facilities and points of interest, the location database associating each of the different locations with a Global Positioning System (GPS) location or range of GPS locations;
   collecting user location data over a period of time, user location data specifying a user's mobile device's location throughout the period of time, the data collection module to store the user location data within a database;
   analyzing the user location data over the period of time and responsively schedule content distributions to the user's mobile device based on the analysis of the user location data;
   collecting wireless signal strength data at the various locations specified by the location data, wherein the wireless signal strength data indicates signal strength between the mobile device and a wireless network at the various locations, and
   wherein analyzing comprises an analysis of both the signal strength data and the user location data to responsively schedule the content distributions to the user's mobile device;
   wherein if the wireless signal strength indicates a poor signal strength at a particular location at which the user is predicted to be, then responsively scheduling pre-caching of content to the user's mobile device prior to arrival at the location.

2. The system as in claim 1 wherein operation of user location data collection additionally collects user activity data indicating user activity on the mobile device at the various locations specified by the location data, the method further comprising analyzing both the user activity and the user location data to responsively schedule the content distributions to the user's mobile device.

3. The system as in claim 1 wherein the scheduling of content distributions comprises:
   determining based on the user location data that the user will be at a particular location at a particular time during the day; and pre-caching the user's mobile device with content based on the determination.

4. The system as in claim 3 further comprising:
triggering logic to trigger the pre-cached content when the user is predicted to be at the particular location.

5. The system as in claim 1 wherein the predictive scheduler module further analyzes personal user data to determine whether the user will be at a particular location at a particular time and responsively schedules content distributions to the user's mobile device based on the analysis of the user location data and the personal user data.

6. The system as in claim 5 wherein the personal user data comprises the user's calendar data specifying the user's schedule.

7. The system as in claim 5 wherein the personal user data comprises the user's preferences, determined by monitoring user activity over a period of time.

8. The system as in claim 1 wherein the pre-caching schedule indicates that the content will be transmitted to the mobile device a specified amount of time prior to the predicted time that the user will be at the location.

9. The system as in claim 1 wherein the pre-caching schedule indicates that the content will be transmitted to the mobile device when the mobile device is within a specified range of the location.

10. A computer-implemented method comprising:
storing a plurality of different locations including event facilities and points of interest in a location database, the location database associating each of the different locations with a Global Positioning System (GPS) location or range of GPS locations;
collecting user location data over a period of time, user location data specifying a user's mobile device's location throughout the period of time;
storing the user location data within a database;
analyzing the user location data over the period of time; and
responsively scheduling content distributions to the user's mobile device based on the analysis of the user location data;
collecting wireless signal strength data at the various locations specified by the location data, wherein the wireless signal strength data indicates signal strength between the mobile device and a wireless network at the various locations; and
analyzing both the signal strength data and the user location data; and responsively scheduling the content distributions to the user's mobile device based on the analysis of the signal strength data and the user location data;
wherein if the wireless signal strength indicates a poor signal strength at a particular location at which the user is predicted to be, then responsively scheduling pre-caching of content to the user's mobile device prior to arrival at the location.

11. The method as in claim 10 further comprising:
collecting user activity data indicating user activity on the mobile device at the various locations specified by the location data; and
analyzing both the user activity and the user location data; and
responsively scheduling the content distributions to the user's mobile device based on the analysis of the user activity data and the user location data.

12. The method as in claim 10 wherein the scheduling of content distributions comprises:
determining based on the user location data that the user will be at a particular location at a particular time during the day; and
pre-caching the user's mobile device with content based on the determination.

13. The method as in claim 12 further comprising:
triggering the pre-cached content when the user is predicted to be at the particular location.

14. The method as in claim 10 further comprising:
further analyzing personal user data to determine whether the user will be at a particular location at a particular time; and
responsively scheduling content distributions to the user's mobile device based on the analysis of the user location data and the personal user data.

15. The method as in claim 14 wherein the personal user data comprises the user's calendar data specifying the user's schedule.

16. The method as in claim 14 wherein the personal user data comprises the user's preferences, determined by monitoring user activity over a period of time.

17. The method as in claim 10 wherein the pre-caching schedule indicates that the content will be transmitted to the mobile device a specified amount of the time prior to the predicted time that the user will be at the location.

18. The method as in claim 10 further comprising:
Scheduling content for delivery to the mobile device when the mobile device is within a specified range of the location.

* * * * *